US008549289B2

(12) United States Patent
Grebenik et al.

(10) Patent No.: US 8,549,289 B2
(45) Date of Patent: Oct. 1, 2013

(54) SCOPE MODEL FOR ROLE-BASED ACCESS CONTROL ADMINISTRATION

(75) Inventors: Vladimir V. Grebenik, Redmond, WA (US); Pretish Abraham, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 668 days.

(21) Appl. No.: 12/488,604

(22) Filed: Jun. 22, 2009

(65) Prior Publication Data

US 2010/0325724 A1 Dec. 23, 2010

(51) Int. Cl.
*H04L 29/06* (2006.01)

(52) U.S. Cl.
USPC ............................................. 713/166

(58) Field of Classification Search
USPC ............................................. 713/166
See application file for complete search history.

(56) References Cited

U.S. PATENT DOCUMENTS

| 6,085,191 | A | 7/2000 | Fisher et al. |
| 6,768,988 | B2 | 7/2004 | Boreham et al. |
| 7,685,206 | B1 * | 3/2010 | Mathew et al. ............ 707/785 |
| 7,895,664 | B2 * | 2/2011 | Desai et al. ............... 726/27 |
| 2003/0046576 | A1 * | 3/2003 | High et al. ................ 713/200 |
| 2003/0229623 | A1 * | 12/2003 | Chang et al. ................ 707/3 |
| 2007/0283443 | A1 | 12/2007 | McPherson et al. |
| 2008/0034438 | A1 | 2/2008 | Mireku |
| 2008/0243856 | A1 | 10/2008 | Corley et al. |
| 2009/0106823 | A1 * | 4/2009 | Durski ....................... 726/4 |

OTHER PUBLICATIONS

"Administering Roles and Permissions", Retrieved at <<http://www.sunsource.net/scdocs/scdocs/DomAdminRoles.html.en>>.
Sandhu, et al., "Role-Based Access Control Models", Retrieved at <<http://csrc.nist.gov/rbac/sandhu96.pdf>>, IEEE Computer, vol. 29, No. 2, Feb. 1996.
"Security and Roles in PerformancePoint Planning", Retrieved at <<http://office.microsoft.com/en-us/help/HA102284661033.aspx>>.
Stoupa, et al., "Web-based Delegation using XML", Retrieved at <<http://oswinds.csd.auth.gr/papers/smc04st.pdf>>, IEEE International Conference on Systems, Man and Cybernetics, vol. 6, Oct. 10-13, 2004, pp. 5189-5194.

* cited by examiner

*Primary Examiner* — Kambiz Zand
*Assistant Examiner* — Abiy Getachew (57) ABSTRACT

Architecture that provides centrally located role-based administration where role assignments that are used to calculate scopes for each operation and create a filtered request that only returns objects that the user is allowed to manage. No access checks are needed. The architecture addresses the proliferation of scope definitions by at least creating a set of relative scopes such as that can generically apply to multiple users at once. More specifically, self-relative scopes and absolute scopes are provided.

20 Claims, 8 Drawing Sheets

SCOPE MODEL FOR ROLE-BASED ACCESS CONTROL ADMINISTRATION

BACKGROUND

In a role-based access control (RBAC) administration system user is assigned certain actions and a set of scopes where these actions are applicable. For example, an administrator of a Finance department should only see members of that department, but not Sales. The classic access check approach assumes that the user can request any data and then will be validated either at the resources level (e.g., discretionary access control list (DACL) model) or in a RBAC gatekeeper module. In the case where the number of objects outside the user scope is very large and permissions are very granular, however, this approach does not scale well, thereby impacting performance overhead when processing read and write scopes.

Another problem is the proliferation of scope definitions. For example, if there is a need to grant each manager the ability to change the title for their reports, individual scopes would need to be created and assigned for each manager. In the classic ACL (access control list) model, this means that a specific ACE (access control element) is stamped with the manager's security identification (SID) onto each of the manager report objects and keeps this configuration in synchronism with the actual list of reports. This adds complexity to the permission model as well, such as when a manager changes, for example, the ACEs on each of the employees that reported to the previous manager need to be updated to the new manager.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides centrally located role-based administration where the permission assignments of a user (as one example of a security principal) are used to calculate scopes for each allowed operation and create a filtered request to return only resource objects that the user is allowed to manage. The architecture allows administrators to create new scopes based on arbitrary relationships. A security principal is a user, group, or computer object that is authorized by the role-based system to run a set of allowed actions against a given set of resources. The scope defines the allowed set of resources. No access checks against each resource are required.

Unlike the DACL model, the resource objects are free of association of ACEs (read or write) or SIDs of security principals authorized or denied to access them. In other words, according to the disclosed architecture, the scope by itself is agnostic of actions and authorized security principals. The architecture addresses the proliferation of scope definitions by at least one or more relative scopes that can generically apply to multiple users at once. Relative scope can return different results for each security principal based on a relative relationship between the principal and the resource the principal is trying to access.

Moreover, the architecture can compute multiple scopes associated with users, concurrently, when running the same action or different actions. The resulting scope check ensures the object is allowed for user actions.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture is a centralized located role-based security layer (e.g., role-based access control (RBAC)) that, inter alia, creates, defines, and applies relative and absolute (non-relative) scopes to roles. Role assignments are used to calculate the scopes for each operation and create a filtered request that returns objects that the user is allowed to manage. For example, relative scopes such as My Self, My Reports, My Distribution Groups, My Executive Assistant, etc., can be created and employed generically apply to multiple users. Other aspects are described herein as well.

In existing access-based solutions, the implementation of mailbox creation, for example, requires granting write access to the store database, directory services, and other files on the server. With RBAC, implementation-specific knowledge and permission are no longer required; hence, providing the capability for abstraction completely from the administrator. With RBAC, administrators only need to understand the delegation of actions and scopes. Hence, the scope is set of resource objects. The scope itself is agnostic of the type of actions and users who will access these resource objects. Moreover, this abstraction helps engineering refactoring of storage systems from one version to another and without changing permission grants of users and associated actions.

Consider a user, UserA, authorized by the role-based system to update a job title of UserA's direct reports, where "direct reports" is a first scope, Scope1. As a result, when UserA attempts to update the title of some user, UserB, the role-based framework checks to determine if UserB is allowed by Scope1.

UserA may also be authorized to update the phone number for any user in the Sales Department in the North America region, where "Sales Department" is a second scope, Scope2. As a result, when UserA attempts to update the phone number of some user, UserC, the role-based framework checks to determine if UserC is allowed by Scope2.

Now consider when UserA attempts to update both the title and the phone number for a user UserD. The role-based framework computes the associated scope for each action; and hence, will authorize both actions (title, phone number) only if UserD is allowed by Scope1 and Scope2. In other words, the architecture can compute multiple scopes associated with users, concurrently, when running the same action or different actions. The resulting scope check ensures the object is allowed for user actions. If over time, UserA is no longer a manager, the evaluation of the relative scope "direct reports" will result in zero objects returned.

In the above example, the single "direct reports" scope is a relative scope. For UserA, the relative scope of "direct reports" can include UserE, UserF, and UserG, since UserA is their manager. For a UserH, the relative scope of "direct reports" can include UserI, UserJ and UserK, since UserH is their manager.

In addition, the architecture also defines an absolute scope which evaluates to a consistent set of resource objects, regardless of which security principal is trying to access the object. In the above example, the Sales Department organization is an absolute scope, since this scope always evaluates to a set of sales employees regardless of the relationships.

Example of absolute scopes include the following: a specific container in storage hierarchy such as Container=OU=Sales, OU=NorthAmerica, CN=Contoso, CN=Com. A filter-based query under a specific container in the hierarchy can appear as the following: Container=CN=Contoso, CN=Com; Filter=(JobTitle—eq 'Marketing')

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
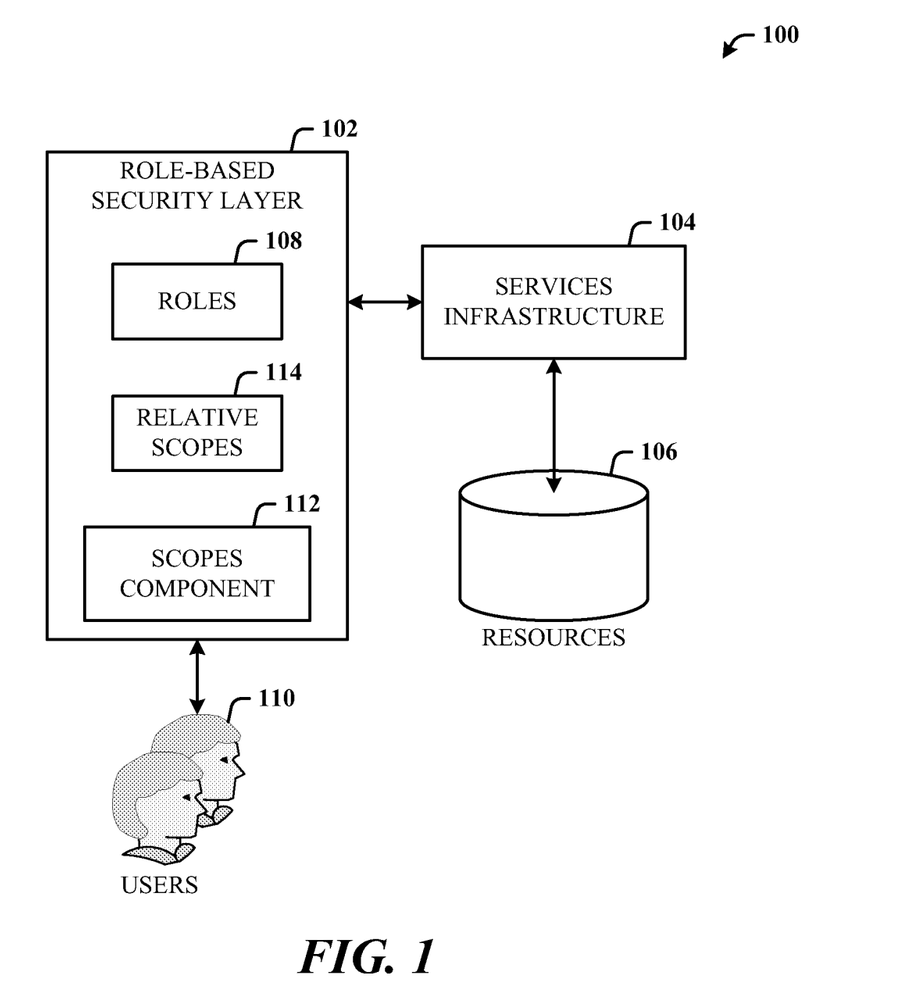
FIG. 1 illustrates a computer-implemented access control system in accordance with the disclosed architecture.

FIG. 1 illustrates a computer-implemented access control system 100 in accordance with the disclosed architecture. The system 100 includes a role-based security layer 102 applied to a services infrastructure 104 for controlling access to resources 106 by assignment of roles 108 to users 110, and a scopes component 112 of the layer 102 for defining relative scopes 114 for the roles 108 to control access to the resources 106.

The assigned roles 108 are centrally located for centralized administration of the services infrastructure 104. The relative scopes 144 are applied concurrently and generically to one or more of the users 110. A relative scope is evaluated at runtime based on a user associated with the relative scope. The scopes component 112 defines an absolute scope that is independent of a user to which the absolute scope applies. The relative scopes 114 are created by an administrator, and the relative scopes 114 relate to at least one of self, groups, distribution groups, or reports. The relative scope can be assigned to an end-user.

Figure 2:
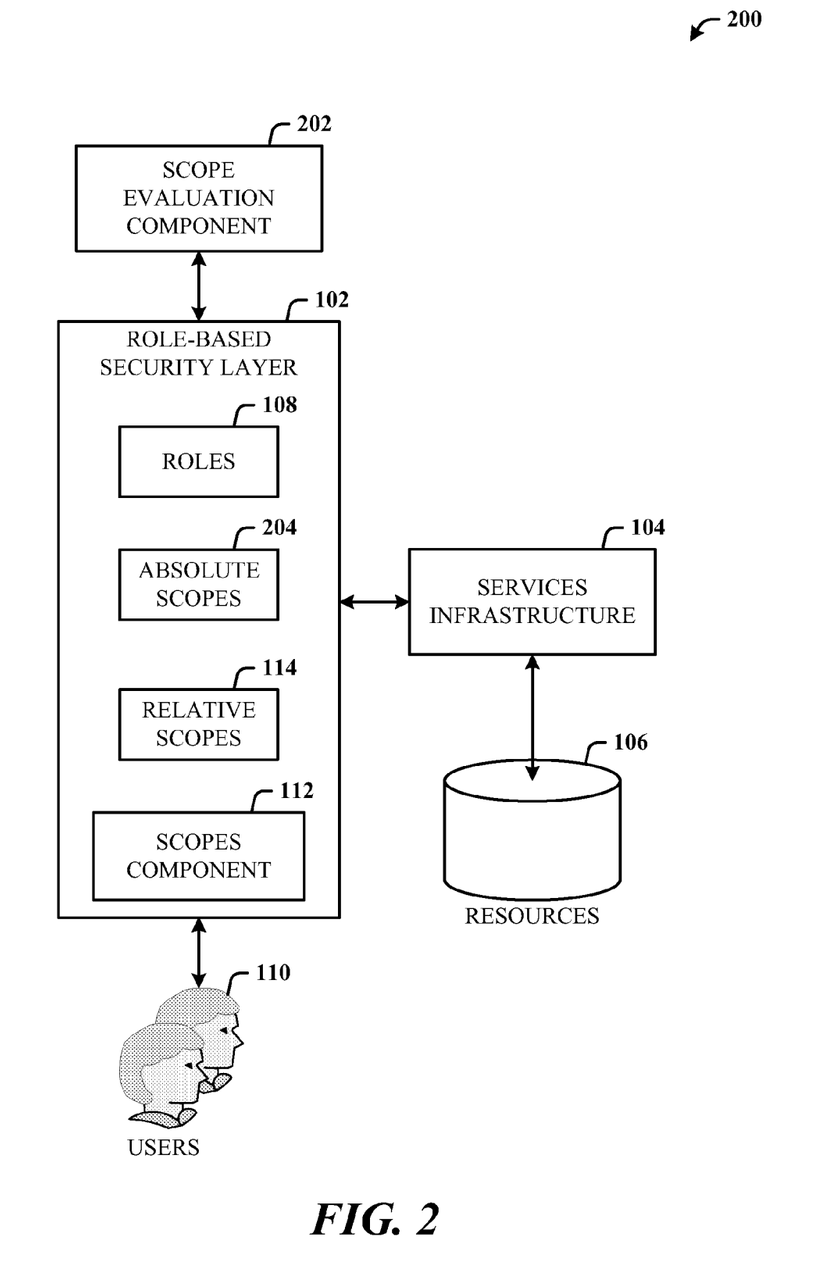
FIG. 2 illustrates an alternative embodiment of an access control system that further includes reporting capability.

FIG. 2 illustrates an alternative embodiment of an access control system 200 that further includes scope evaluation capability. The system 200 includes the role-based security layer 102 as applied to the services infrastructure 104 for controlling access to the resources 106 by assignment of the roles 108 to one or more of the users 110, and the scopes component 112 of the layer 102 for defining the relative scopes 114 for the roles 108 to control access to the resources 106.

The system 200 further comprises a scope evaluation component 202 for searching not only the relative scopes, but all scopes such as absolute scopes, for a specific subset of the scopes according to a filter and storage hierarchy of the resources 106. In other words, the resources 106 can be structured as a hierarchy of data, and filtering can be applied at selected points in the hierarchy, as well as filtered. Additionally, the scope evaluation component can compute multiple scopes associated with users, concurrently, when running a same action or different actions.

The roles 108 and scopes (including the relative scopes 114) can be stored centrally for centralized administration of the services infrastructure 104. The relative scopes 114 are applied concurrently and generically to one or more of the users 110. A relative scope is evaluated at runtime based on a user associated with the relative scope. The scopes component 112 also defines absolute scopes 204 that are independent of a user to which an absolute scope applies. The relative scopes 114 are created by an administrator, and the relative scopes 114 relate to at least one of self, groups, distribution groups, or reports.

The absolute scope is independent of the user to which the scope applies, for example, "all users under OU=Redmond, DC=contoso, DC=com", or "Everyone in Marketing Department". The relative scope is evaluated dynamically for each user to which the scope applies. For example, "My distribution groups" scope for User A evaluates to the groups whose "owner" attribute is pointing to User A; while for User B, it can be a totally different set of groups. Other relative scopes are "Self", "My Reports", etc.

Figure 3:
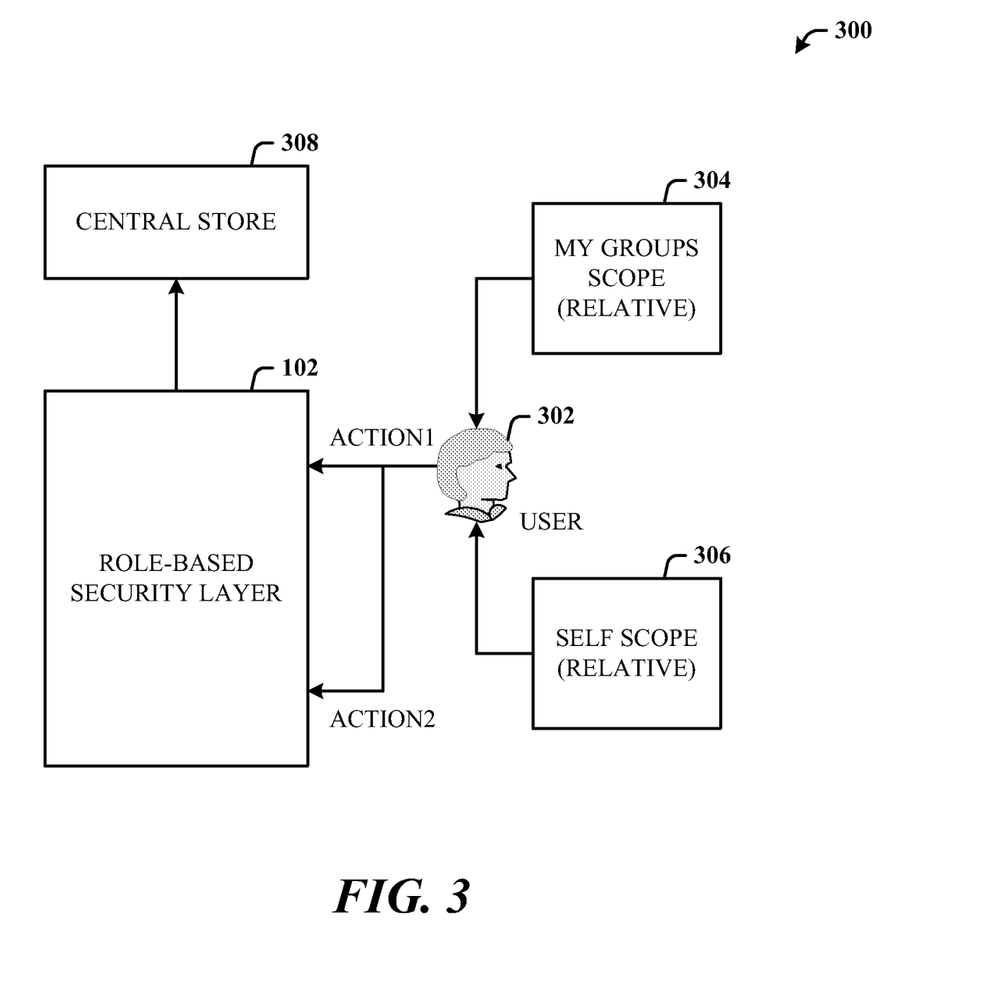
FIG. 3 illustrates an example flow diagram of a system for end-user and relative scopes.

The disclosed model pre-calculates read and write scopes as filters (e.g., LDAP-lightweight data access protocol) and applies the read and write scopes upfront. As a result, only objects in the scope are evaluated and returned. Moreover, these scopes are easy to audit and understand. Similar to roles, rather than translating the scoping intent into a set of resource permissions, the scope intent is preserved. FIG. 3 illustrates an example flow diagram of a system 300 for end-user and relative scopes. A scope defines where a user can perform actions. A user 302 creates a My Groups relative scope 304 and a self scope (relative) 306. The My Groups scope 304 provides access by the user 302 to groups of which the user 302 is a member.

The user 302 initiates two actions to the role-based security layer 102: an Action1, to add a second user to a User Reports group of the user 302, and Action2, to add a phone number of the user 302. These actions are input to the security layer 102, which authorizes the actions, and checks a central store 308 to determine if the objects are under scope for the user 302. Relative scopes are evaluated at runtime (dynamically) based on the user relationship with an object. For example, a check is made to determine if a given group object (e.g., My Groups scope 304) belongs to the user that is attempting to manage that object. The central store 308 finds the user object and updates the phone number, finds the "User Reports" group and updates the membership to include the second user.

Figure 4:
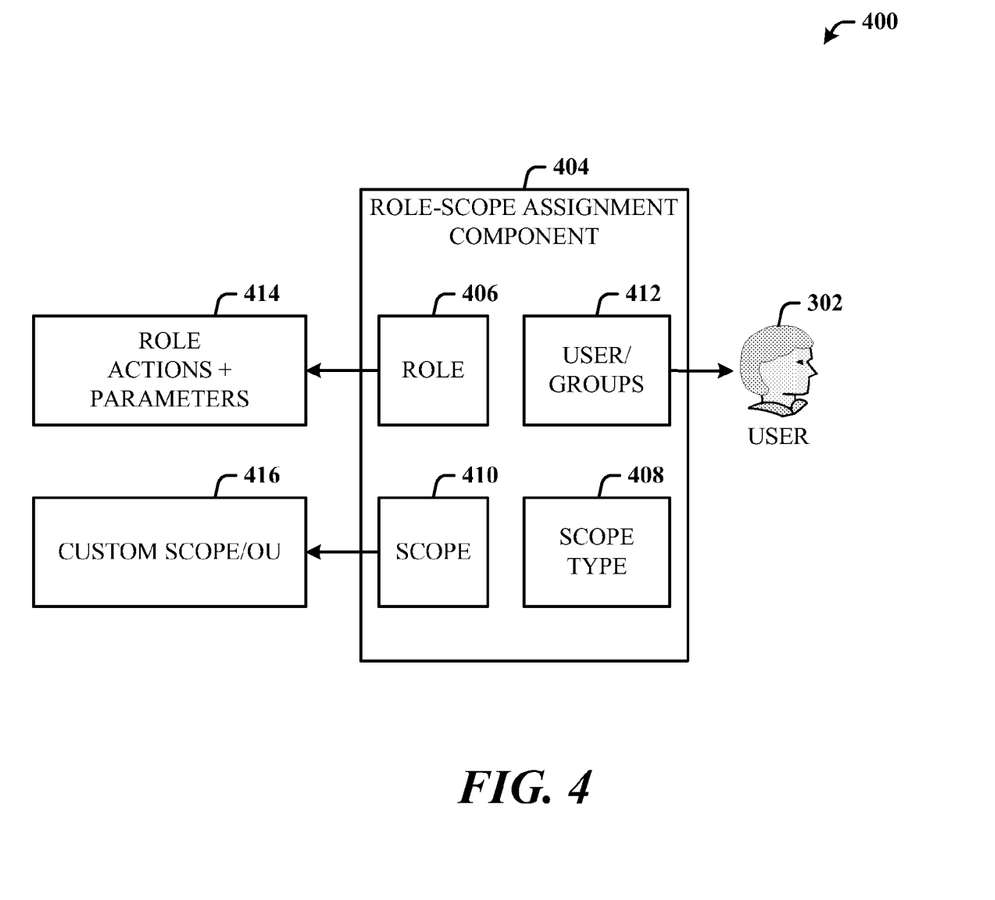
FIG. 4 illustrates a system for role and scope assignment to a user.

FIG. 4 illustrates a system 400 for role and scope assignment to a user 402. The system 400 includes a role-scope assignment component 404 (e.g., role-based security layer 102 of FIG. 1) for defining a role 406, scope type 408, scope 410 for the scope type 408, and then assigning the role 406 and scope 410 to a user (e.g., user 302) or groups of users 412. The role 406 includes role actions (also referred to as commandlets—"cmdlets") and action parameters 414 that define the permissions associated with the role 406. The system 400 also includes derivations of the scope 410, which comprise custom scope or an organizational unit (OU) scope 416.

Roles and scopes can be assigned to both users and groups 412. Ways in which to grant administrators roles and scopes include indirectly by adding the administrator to a group that is already granted a specific scope and role, and directly using scope and role assignment cmdlets.

Using groups for delegation is a natural way of simplifying things, but in the RBAC there is a danger that a recipient administrator or someone who has permissions to add a distribution group member in the same scope as that group will be able to add itself to any administration group. To mitigate this problem the groups used for delegation live in a separate scope (e.g., a custom scope or a top-level OU).

Self-service roles and scopes find particular application for hosted deployments to reduce the administrator/user ratio. A self-service autogroup (group management) functionality provides this capability. The self-service scenarios can include supporting end-user and self-group management. For example, an end-user is provided access to manage personal data. This can be provided as an out-of-the-box self role for which the user has self write permission and self read permission. The self role can also have access to set-mailbox and set-user cmdlet, for example.

The user can also create a DL (distribution list) and is restricted to modify only DLs the user can own. A self DL management role is created and has a write restriction filter to set only DLs that users own—which (managedBy=user) filter.

Put another way, the access control system includes the role-based security layer applied to a services infrastructure for controlling access to resources by assignment of roles to users, the scopes component of the security layer for defining relative scopes and absolute scopes according to filters and a storage hierarchy, and the centrally-located storage component for storing the roles and scopes, the storage component accessed by the role-based security layer to administer the roles and scopes to the services infrastructure.

The scopes include a relative scope that is applied concurrently and generically to multiple users, the relative scope is evaluated at runtime based on a user associated with the relative scope. The scopes component further defines an absolute scope that is independent of a user to which the scope applies. The relative scopes relate to at least one of self, groups, or reports. The scopes component facilitates creation of new absolute scopes defined as filters or containers. The system further comprises the scope evaluation component for searching the scopes for a specific subset according to a filter and the storage hierarchy.

Following is a table of absolute and relative scopes that can be utilized in the scope model for the disclosed RBAC administration architecture.

| Scope | Can be implicit? |
|---|---|
| My Organization (all domain NCs) | Yes |
| My GAL (global access list) | Yes |
| My HAB (hierarchical address book) department | Yes |
| Myself | Yes |
| My direct reports | Yes |
| Custom: OU | No |

-continued

| Scope | Can be implicit? |
|---|---|
| Custom: OU with filter | No |
| My groups | No |
| Executive whose assistant I am | No |
| My Organization Config (everything in Config NC) | Yes |
| Custom server scope (filter) | No |
| My Roles | Yes |
| Not Applicable (for Custom roles with 3$^{rd}$ party cmdlets or scripts) | Yes |
| None (no access) | Yes |

Role assignments can use implicit scopes. The implicit scopes can be domain scopes or configuration scopes. At role assignment time, if scopes are not supplied, the assignment uses the implicit scopes of the role. In most cases, the implicit scopes are the correct scopes required at assignment time. Implicit scopes can be aggregated as well.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
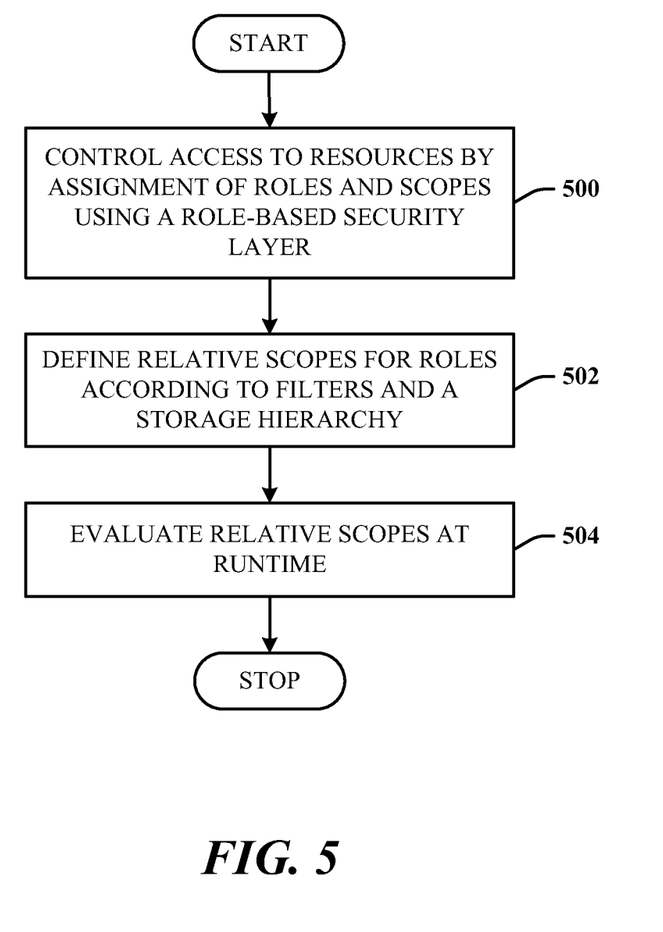
FIG. 5 illustrates a computer-implemented access control method.

FIG. 5 illustrates a computer-implemented access control method. At 500, access to resources is controlled by assignment of roles (e.g., to users) using a role-based security layer. At 502, relative scopes for the roles are defined according to filters and a storage hierarchy. At 504, the relative scopes are evaluated at runtime.

Figure 6:
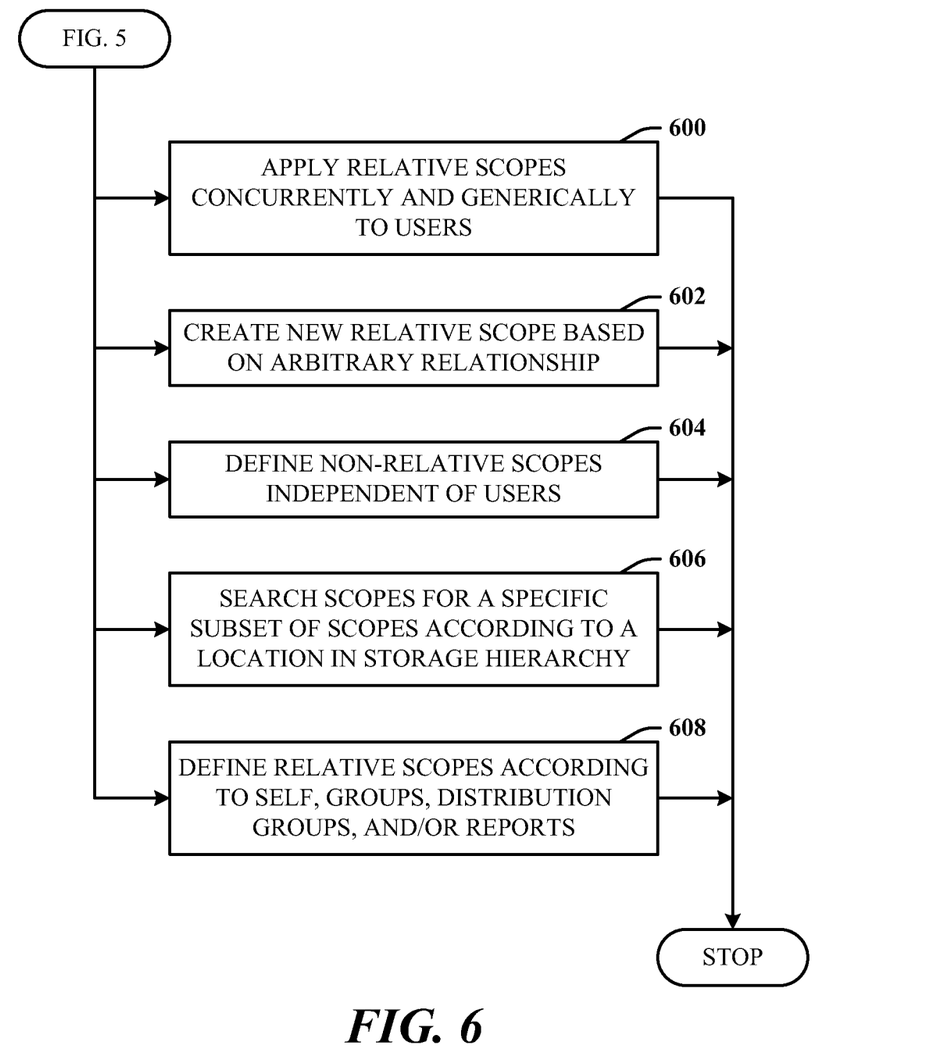
FIG. 6 illustrates additional aspects of the method of FIG. 5.

FIG. 6 illustrates additional aspects of the method of FIG. 5. At 600, the relative scopes are applied concurrently and generically to users. At 602, a new relative scope is created based on an arbitrary relationship. At 604, non-relative scopes are defined independent of the users. At 606, the scopes are searched for a specific subset of the scopes according to a location in the storage hierarchy. At 608, the relative scopes are defined according to self, groups, distribution groups, and/or reports.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
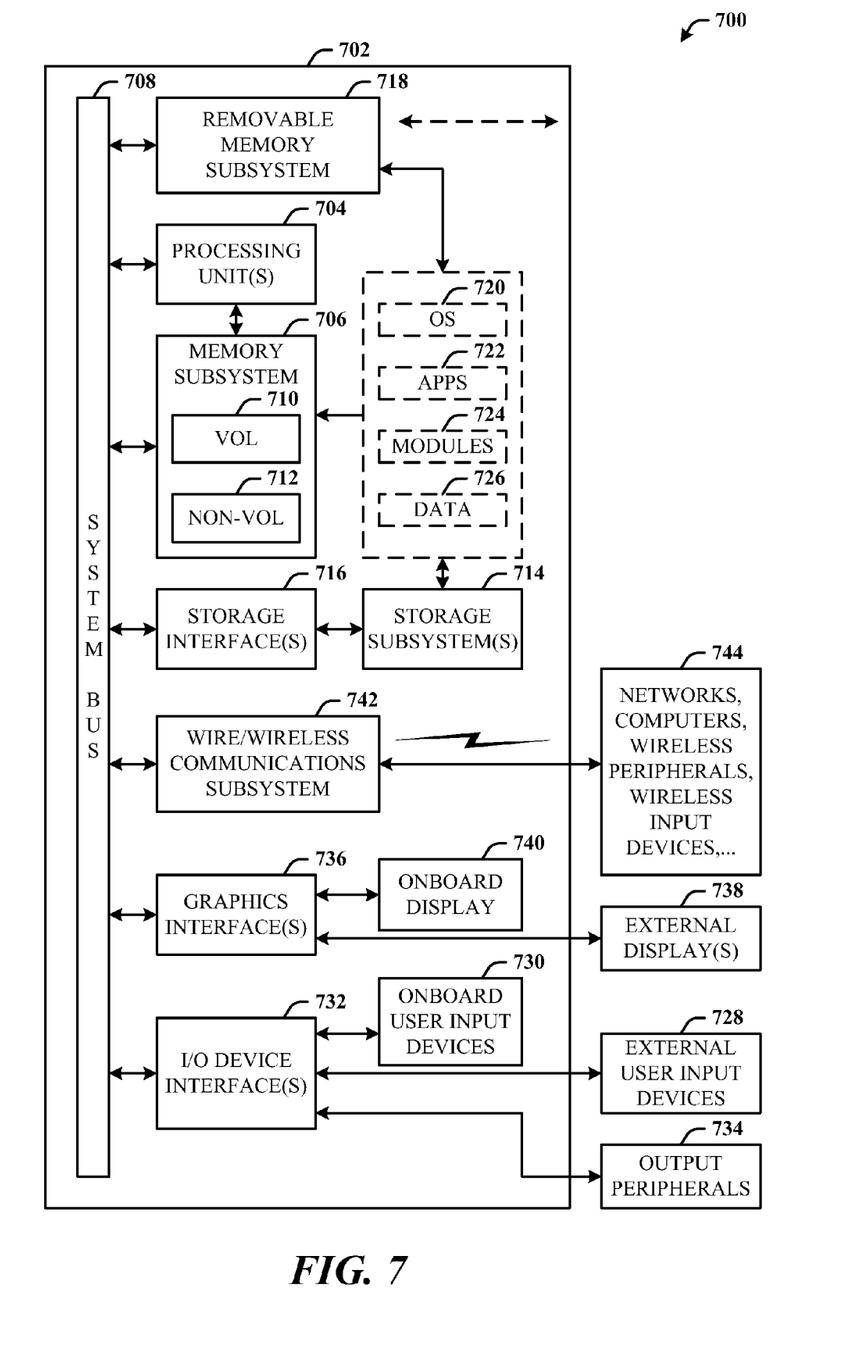
FIG. 7 illustrates a block diagram of a computing system operable to define and process scopes in accordance with the disclosed architecture.

Referring now to FIG. 7, there is illustrated a block diagram of a computing system 700 operable to define and process scopes in accordance with the disclosed architecture. In order to provide additional context for various aspects thereof, FIG. 7 and the following discussion are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the memory subsystem 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes storage subsystem(s) 714 and storage interface(s) 716 for interfacing the storage subsystem(s) 714 to the system bus 708 and other desired computer components. The storage subsystem(s) 714 can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The one or more application programs 722, other program modules 724, and program data 726 can include some or all of the entities and components of the system 100 of FIG. 1, some or all of the entities and components of the system 200 of FIG. 2, some or all of the entities and components of the system 300 of FIG. 3, some or all of the entities and components of the system 400 of FIG. 4, and the methods and additional aspects represented in the flow charts of FIGS. 5-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Computer readable media can be any available media that can be accessed by the computer 702 and includes volatile and non-volatile media, removable and non-removable media. For the computer 702, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP) using logical connections via a wired/wireless communications subsystem 742 to one or more networks and/or other computers. The other computers can include workstations, servers, routers, personal computers, microprocessor-based entertainment appliance, a peer device or other common network node, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or has other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 8:
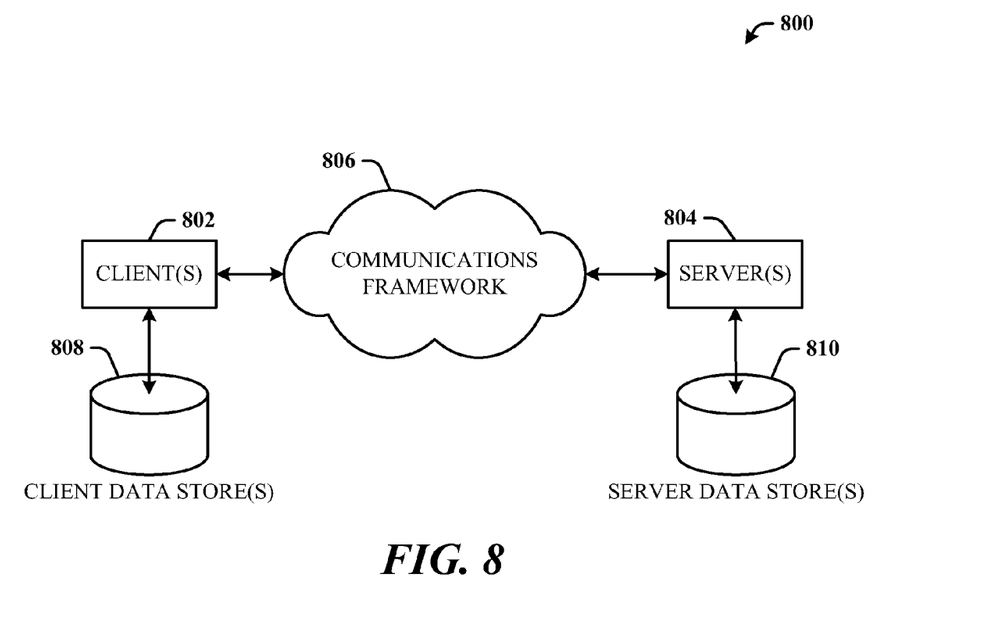
FIG. 8 illustrates a schematic block diagram of a computing environment that supports a scope model as described herein.

Referring now to FIG. 8, there is illustrated a schematic block diagram of a computing environment 800 that supports a scope model as described herein. The environment 800 includes one or more client(s) 802. The client(s) 802 can be hardware and/or software (e.g., threads, processes, computing devices). The client(s) 802 can house cookie(s) and/or associated contextual information, for example.

The environment 800 also includes one or more server(s) 804. The server(s) 804 can also be hardware and/or software (e.g., threads, processes, computing devices). The servers 804 can house threads to perform transformations by employing the architecture, for example. One possible communication between a client 802 and a server 804 can be in the form of a data packet adapted to be transmitted between two or more computer processes. The data packet may include a cookie and/or associated contextual information, for example. The environment 800 includes a communication framework 806 (e.g., a global communication network such as the Internet) that can be employed to facilitate communications between the client(s) 802 and the server(s) 804.

Communications can be facilitated via a wire (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented access control system, comprising:
   a role-based security layer applied to a services infrastructure for controlling access to resources by assignment of roles to users;
   a scopes component of the layer for defining relative scopes and absolute scopes for the roles to control the access to the resources, wherein the relative scopes are applied concurrently and generically to the users, and the absolute scopes are independent of a user to which the absolute scopes apply;
   a scope evaluation component for computing multiple scopes associated with users, concurrently, when running a same action or different actions; and
   a microprocessor that executes computer-executable instructions in a memory.

2. The system of claim 1, wherein the assigned roles are centrally located for centralized administration of the services infrastructure.

3. The system of claim 1, wherein the relative scopes are evaluated at runtime based on a user associated with the relative scope.

4. The system of claim 1, wherein the relative scopes are created by an administrator, the relative scopes related to at least one of self, groups, distribution groups, or reports.

5. The system of claim 1, wherein a relative scope of a user is created by the user.

6. The system of claim 1, wherein the scope evaluation component further comprises searching all scopes for a specific subset of the scopes according to a filter and storage hierarchy of the resources.

7. A computer-implemented access control system, comprising:
   a role-based security layer applied to a services infrastructure for controlling access to resources by assignment of roles to users;
   a scopes component of the security layer for defining relative scopes and absolute scopes according to filters and a storage hierarchy, wherein the relative scopes are applied concurrently and generically to a user, and the absolute scopes are independent of a user, and wherein the scopes component facilitates creation of new absolute scopes defined as filters or containers;
   a centrally-located storage component for storing the roles and scopes, the storage component accessed by the role-based security layer to administer the roles and scopes to the services infrastructure; and
   a microprocessor that executes computer-executable instructions in a memory.

8. The system of claim 7, wherein the scopes include a relative scope that is applied concurrently and generically to multiple users, the relative scope is evaluated at runtime based on a user associated with the relative scope.

9. The system of claim 7, wherein the scopes component further defines an absolute scope that is independent of a user to which the scope applies.

10. The system of claim 7, wherein the relative scopes relate to at least one of self, groups, or reports.

11. The system of claim 7, wherein the scopes component further defines an absolute scope which evaluates to a consistent set of resource objects, regardless of which security principal is trying to access the object.

12. The system of claim 7, further comprising a scope evaluation component for computing multiple scopes associated with users, concurrently, when running a same action or different actions.

13. A computer-implemented access control method, comprising acts of:
controlling access to resources by assignment of roles and scopes using a role-based security layer;
defining relative scopes for the roles according to filters and a storage hierarchy;
defining absolute scopes for the roles that are independent of a user to which the absolute scopes applies;
defining new absolute scopes as filters or containers;
evaluating the relative scopes at runtime; and
utilizing a microprocessor that executes instructions stored in a memory.

14. The method of claim 13, further comprising applying the relative scopes concurrently and generically to users.

15. The method of claim 13, further comprising creating a new relative scope based on an arbitrary relationship.

16. The method of claim 13, further comprising defining non-relative scopes independent of the users.

17. The method of claim 13, further comprising searching the scopes for a specific subset of the scopes according to a location in the storage hierarchy.

18. The method of claim 13, further comprising defining the relative scopes according to self, groups, distribution groups, and reports.

19. The system of claim 1, wherein the role-based security layer comprises a role-scope assignment component for defining: at least one of the roles; a scope type; and a scope for the scope type, and then assigning the role and scope to at least one of the users or groups of the users.

20. The system of claim 19, wherein the at least one of the roles includes role actions and action parameters that define permissions associated with the respective role.

\* \* \* \* \*